(12) United States Patent
Hillis et al.

(10) Patent No.: US 6,725,161 B1
(45) Date of Patent: Apr. 20, 2004

(54) METHOD FOR LOCATING AND IDENTIFYING UNDERGROUND STRUCTURES WITH HORIZONTAL BOREHOLE TO SURFACE TOMOGRAPHY

(75) Inventors: W. Daniel Hillis, Toluca Lake, CA (US); Bran Ferren, Beverly Hills, CA (US)

(73) Assignee: Applied Minds, Inc., Glendale, CA (US)

( * ) Notice: Subject to any disclaimer, the term of this patent is extended or adjusted under 35 U.S.C. 154(b) by 35 days.

(21) Appl. No.: 09/941,426

(22) Filed: Aug. 28, 2001

Related U.S. Application Data
(60) Provisional application No. 60/286,601, filed on Apr. 26, 2001.

(51) Int. Cl.[7] .................................................. G01V 1/40
(52) U.S. Cl. ............................................. 702/6; 702/11
(58) Field of Search .................... 702/6–9, 11; 175/40, 175/48; 367/25, 81, 82

(56) References Cited

U.S. PATENT DOCUMENTS

| | | | |
|---|---|---|---|
| 5,208,539 A | * 5/1993 | Holmqvist et al. ......... 324/334 |
| 6,181,138 B1 | * 1/2001 | Hagiwara et al. ........... 324/338 |
| 6,308,787 B1 | * 10/2001 | Alft ............................. 175/48 |
| 6,435,286 B1 | * 8/2002 | Stump et al. ................. 175/26 |

* cited by examiner

*Primary Examiner*—Marc S. Hoff
*Assistant Examiner*—Anthony Gutierrez
(74) *Attorney, Agent, or Firm*—Glenn Patent Group; Michael A. Glenn (57) ABSTRACT

Systems and methods for locating and identifying structures beneath a surface of the earth by processing and transforming a signal transmitted from a horizontal borehole at a specific depth from a surface of the earth into a representation of underground structures.

84 Claims, 5 Drawing Sheets

METHOD FOR LOCATING AND IDENTIFYING UNDERGROUND STRUCTURES WITH HORIZONTAL BOREHOLE TO SURFACE TOMOGRAPHY

CROSS-REFERENCE TO RELATED APPLICATIONS

This application claims priority to U.S. provisional patent application Ser. No. 60/286,601, filed on Apr. 26, 2001.

TECHNICAL FIELD

The invention relates generally to geophysical surveying technology, and more particularly to a method for locating and identifying underground structures with a horizontal borehole to a surface of the earth transmission path geometry.

BACKGROUND OF THE INVENTION

The utilities industry faces a significant problem in protecting underground utilities from damage during excavation. While many methods exist for locating underground utilities, no existing technology is adequate for crowded urban environments. The existing methods have great difficulties with heterogeneous soil conditions, asphalt and concrete surface coverings, nearby metallic objects, and deep pipes. Often, they also create a significant disruption of traffic flow at the surface.

One simple approach currently employed involves the excavation of exploratory boreholes to determine the presence or absence of underground utilities. At best, this process is slow and cumbersome in that a great number of exploratory boreholes must be drilled to locate utilities with adequate spatial resolution. At worst, it is destructive when the utilities to be located and then avoided are inadvertently damaged by the exploratory borehole itself.

Non-destructive digging techniques, such as hand excavation and vacuum drilling with compressed air or high pressure water jets, do alleviate the possibility of exploratory damage, but are inefficient and costly. In addition, the need for placement of surface excavation equipment over the entire area of interest creates significant disruption at the surface.

Thus, while exploratory excavation does provide results with a high level of certainty, it is cumbersome, inefficient, costly, and highly disruptive. Accordingly, other non-destructive methods not requiring excavation have also been proposed, most of which are based on geophysical surveying techniques.

These methods typically involve the introduction of a signal into the region of ground being explored. By noting the extent to which this signal is reflected, transmitted, or absorbed, and by considering the physical properties of soil and any other materials that may lie beneath the surface, the location and in some instances the shape and composition of the underground utilities can be inferred.

Several approaches have relied on acoustic signals for this purpose, as evidenced by a number of United States Patents filed in this area (see References). The most common approach is the use of ground penetrating radar (GPR), as in the systems offered by PipeHawk PLC, of Church Crookham, United Kingdom (http://www.pipehawk.com), and Geophysical Survey System, Inc., of Salem, N.H. (http://www.geophysical.com/). More variations of the GPR approach are described in a large number of United States patents (see References).

The greatest weakness of most such systems is a reliance on a surface transmission and surface reception geometry. Inherent in such approaches is a rather shallow maximum depth from which a return signal of adequate strength can be obtained. Accordingly, many of these technologies experience difficulty in situations where deeply buried utilities must be located. These problems are aggravated when probing through asphalt or concrete surface coverings, in heterogeneous soil conditions, or near metallic objects.

U.S. Pat. No. 4,161,687 granted to Lytle describes a system with a possible alternative geometry. The disclosed approach involves "lowering an electromagnetic signal transmitting antenna down one borehole and a receiving antenna down another, the ground to be surveyed for anomalies being situated between the boreholes." Such an approach, however, requires the excavation of two boreholes.

U.S. Pat. No. 4,751,688 granted to Paulsson describes a downhole seismic source that produces a seismic signal that can be measured at another borehole or perhaps the surface. However, the device is designed for use in vertical boreholes, "particularly cross borehole measurements and vertical seismic profiling".

What is desired is a method, using advances in computing and horizontal boring technology that produces a highly accurate image of underground utilities, with minimal disruption to activities on the surface.

SUMMARY OF THE INVENTION

The method according to the present invention begins by using a horizontal boring tool to excavate a substantially horizontal borehole that crosses under the surface of the earth at a specific depth. The depth is chosen so that the horizontal borehole passes safely below any existing utilities. In the preferred embodiment, one emitter and one receiver are required. The emitter is placed underground and the receiver on the surface. While the emitter is moved along the passage of the borehole, the receiver is moved along a pathway along the surface of the earth. The received signal, which reflects the transmissive properties of the medium between the emitter and the receiver is recorded; and at the same time, measurements of the emitter's and the receiver's positions are taken. The recorded signal data, along with the information representing the measurements, is then processed and transformed into a model of the sub-surface.

The method according to this invention is a direct path method, based on the transmissive, rather than reflective, properties of the surveyed medium. It may be used with a variety of emitter types, including electromagnetic pulse, x-ray, gamma ray, seismic, etc. It may also be used in a multi-sensor mode to combine data from more than one type of emitter. Because the system does not rely on reflections, attenuation should be less of a problem than it is in conventional systems. The direct signal is much stronger than the reflected signal, as it only has to travel one pass through the medium. Also, because the emitter is underground, a more powerful emitter can be used and it is easier to efficiently couple it with the soil.

As an alternative, instead of moving a single emitter, an array of emitters is positioned along the passage of the horizontal borehole. In this way, regardless of the motion pattern of the receiver, the time required to obtain data may be reduced.

In another embodiment, an emitter is moved along a pathway along the surface, while an underground receiver is moved along the passage of the horizontal borehole. As an alternative, instead of moving a single receiver, an array of receivers is used.

In another embodiment, an array of emitters is used to transmitting a signal to an array of receivers, involving the same principle as described above.

In each case, the desired result is a set of data summarizing the transmissive properties obtained from various underground locations, along the borehole, relative to various surface locations, either along a line, in a grid, or in any other geometric configuration.

DETAILED DESCRIPTION OF THE INVENTION

Figure 1:
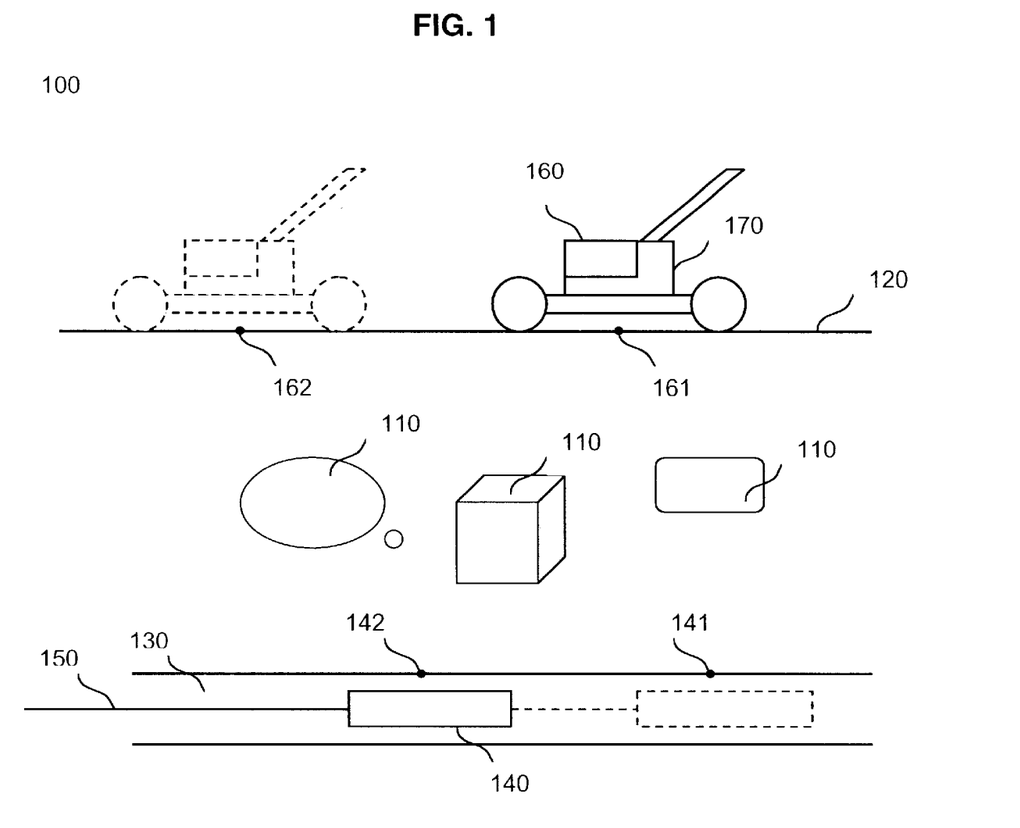
FIG. 1 is a schematic diagram showing a location system according to the preferred embodiment of the invention.

FIG. 1 illustrates a schematic of the utility location system 100 according to this invention. In the preferred embodiment, one emitter 140 and one receiver 160 are required. The emitter 140 is placed underground and the receiver 160 on the surface. While the emitter 140 is stationary at a first position point along an underground borehole 130, the receiver 160 is moved through a range of motion, with measurements taken at various points within that motion. The receiver 160 may be mounted to a mobile unit 170 that includes a data processing unit and a monitor. The emitter 140 is then moved to a next position point along the underground borehole 130. Because both the emitter 140 and the receiver 160 are moved to many different positions, the location system 100 produces a large number of independent measurements, far more than most conventional systems of detection. The location system 100 can use the measured data to reduce the uncertainty in the reading, and to construct a picture of underground structures. Potentially, the system can produce a picture not only of the underground utilities, but also of soil types, areas of fill and other sub-surface inhomogeneities.

Operation of the system begins with the excavation of a substantially horizontal borehole 130 below the surface 120. If the potential utilities 110 are of a linear nature and their orientation is known, the borehole would likely be oriented perpendicular to the utilities. The horizontal borehole 130 passes below the surface 120 at a depth that is so chosen that the horizontal borehole 130 can pass safely below any potential utilities 110. The horizontal borehole 130 should be as small as possible, but large enough to allow passage of the emitter 140. It must also be long enough to safely pass beneath the region where utilities are thought to lie. A borehole of this nature may be excavated with devices such as the Jet Trac™ systems manufactured by Ditch Witch (http://www.ditchwitch.com) of Perry, Okla., the United States.

The emitter 140 is moved along the passage of the horizontal borehole 130, most likely by a towline 150. At a first point 141 along the passage of the borehole 130, the motion of the emitter 140 is paused, and a receiver 160, most likely cart or vehicle mounted, is moved along the surface 120. At various points along the motion of the receiver 160, such as points 161 and 162, measurements of the received signal are made and the receiver and emitter positions are recorded. This process is repeated at a number of other emitter positions such as point 142 along the passage of the horizontal borehole 130. Alternatively, the emitter 140 is moved continuously from one end to the other end of the horizontal borehole 130. From the recorded signal data, which reflects the transmissive properties of the medium between the emitter and the receiver, and the recorded receiver and emitter positions associated with the signal measurements, an image of the underground utilities and other sub-surface structures present is constructed. This may be accomplished through the use of various tomography and inverse problem techniques described in the prior art. Such techniques allow spatial information to be constructed based on a collection of point-to-point transmission path measurements.

Figure 2:
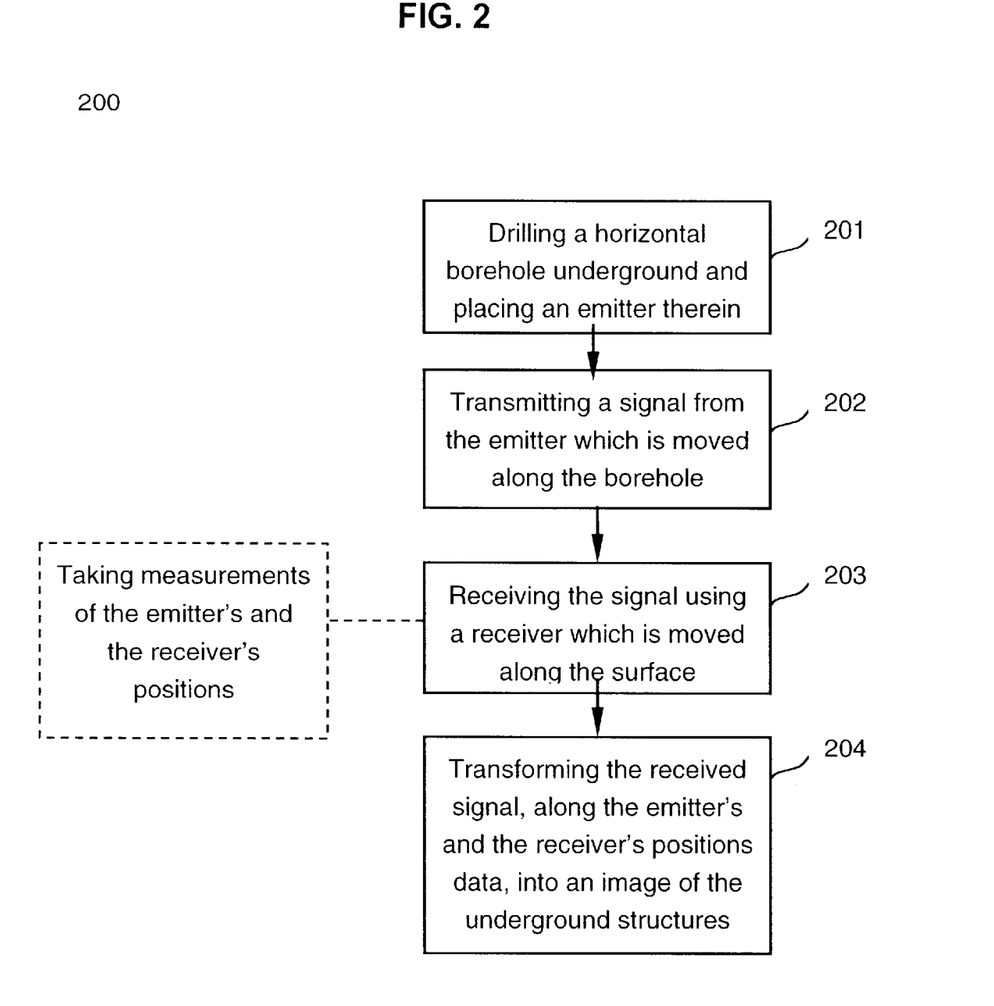
FIG. 2 is a flow diagram illustrating a process of the operation according to the preferred embodiment of the invention.

FIG. 2 is a flow diagram illustrating a basic process 200 according to the preferred embodiment. The process 200 includes the following steps:

201: Drilling a substantially horizontal borehole with a specific length of passage at a specific depth from a surface of the earth. The length of passage and the depth from the surface are so chosen that the horizontal borehole can pass safely beneath the region where any potential utilities may lie;

202: Transmitting a signal from an emitter, which is moved at intervals from one position point to another along the passage of the borehole or continuously from one end to the other end of the borehole's passage. This moving process may be repeated if it is necessary;

203: Receiving the signal with a receiver, which is moved along a pathway along the surface. The pathway may be linear or nonlinear. The moving process can be repeated on one pathway or on different pathways. During the receiver's moving process, the signal is received from the emitter, and concurrently, measurements of the emitter's and the receiver's positions are taken.

204: Transforming the received signal, along with the information on the emitter's and the receiver's positions relative to the underground structures into an image of the underground structures using a data processing unit.

The pattern of motion chosen for the receiver 160 during the measurement process is dependent upon the capabilities of the receiver 160 and the accuracy desired for the resulting image of the underground utilities 110. Ideally, the receiver 160 needs only be moved along a single linear pathway. To obtain an optimal amount of information, the pathway of receiver motion should be oriented perpendicular to the horizontal borehole 130 and the midpoint of the receiver pathway should be aligned directly above the midpoint of the horizontal borehole 130. If the underground utilities 110 are to be reliably imaged with such a single linear receiver pass, the receiver 160 must be capable of determining with precision the received signal strength as a function of incident direction. If the receiver 160 does not have such capability, the accuracy of the constructed image can be improved by gathering data along at least two linear receiver paths along the surface 120. Still better results may be obtained if data is gathered at points substantially covering a planar region along the surface 120. Other more complicated receiver pathways may be envisioned involving combinations of linear and non-linear motions.

In another embodiment, instead of moving a single emitter 140, an array of emitters is positioned along the passage of the horizontal borehole 130. In this way, regardless of the motion pattern of the receiver 160, the time required to obtain data may be reduced. Data may then be gathered in only a single pass of the receiver 160 through the appropriate motion pattern, provided that the receiver 160 can receive signals from all emitters within the array concurrently and can differentiate the signals from each individual emitter. This differentiation may be performed on the basis of, for examples, frequency, phase, or pulsing pattern.

Figure 3:
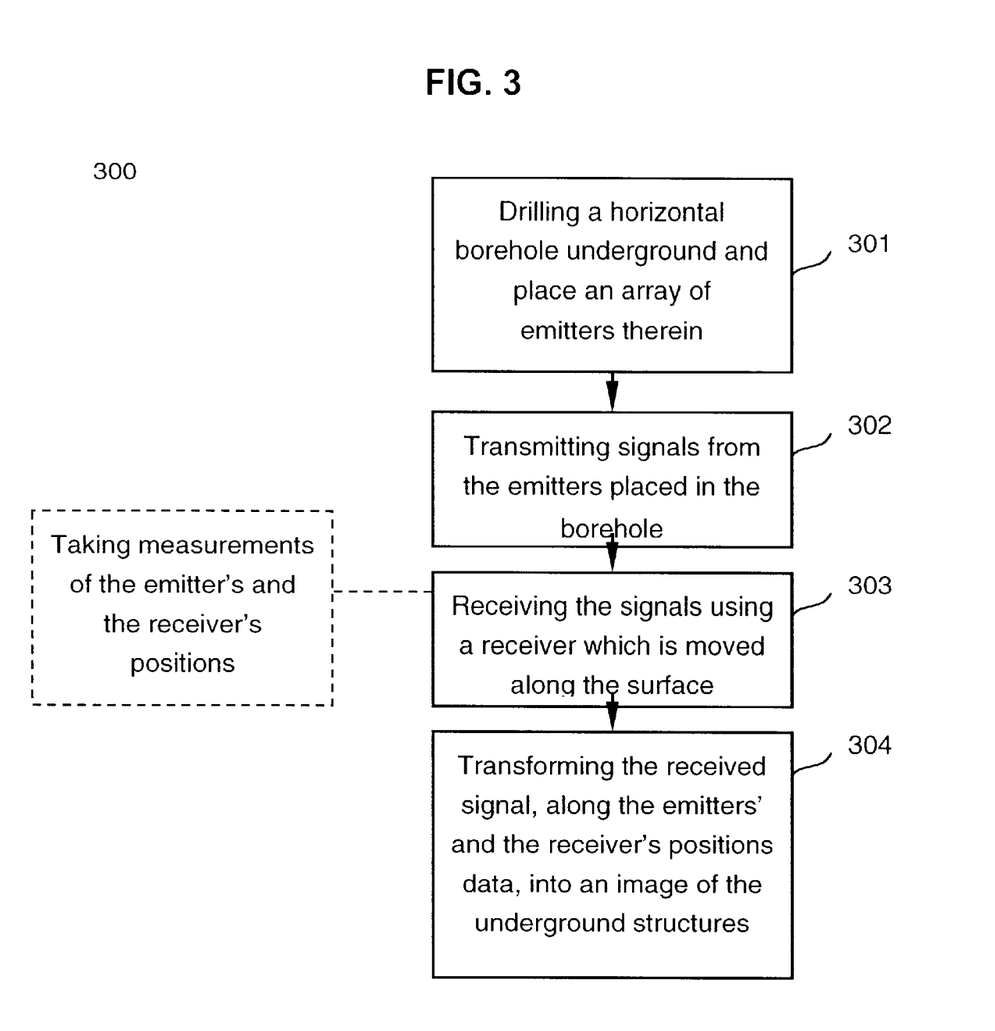
FIG. 3 is a flow diagram illustrating a process of the operation according to the second embodiment of the invention.

FIG. 3 is a flow diagram illustrating a process 300 according to this embodiment. The process 300 includes the following steps:

301. Drilling a substantially horizontal borehole with a specific length of passage at a specific depth from the surface of the earth. The length of passage and the depth from the surface are so chosen that the horizontal borehole can pass safely beneath a region where any potential utilities may lie;
302. Transmitting signals from a transmitter comprising an array of emitters which are placed along the horizontal borehole's passage;
303. Receiving the signals using a receiver which is moved along a pathway along the surface. The pathway may be linear or nonlinear. The moving process can be repeated on one pathway or on different pathways. During the receiver's moving process, the signals are received from the emitters, and concurrently, measurements of the emitters' and the receiver's positions are taken; and
304. Transforming the received signals, along with the information on the emitters' and the receiver's positions relative to the underground structures into an image of the underground structures using a data processing unit.

In a third embodiment, a transmitter is moved along the surface and a receiver is moved along the passage of the horizontal borehole 130.

Figure 4:
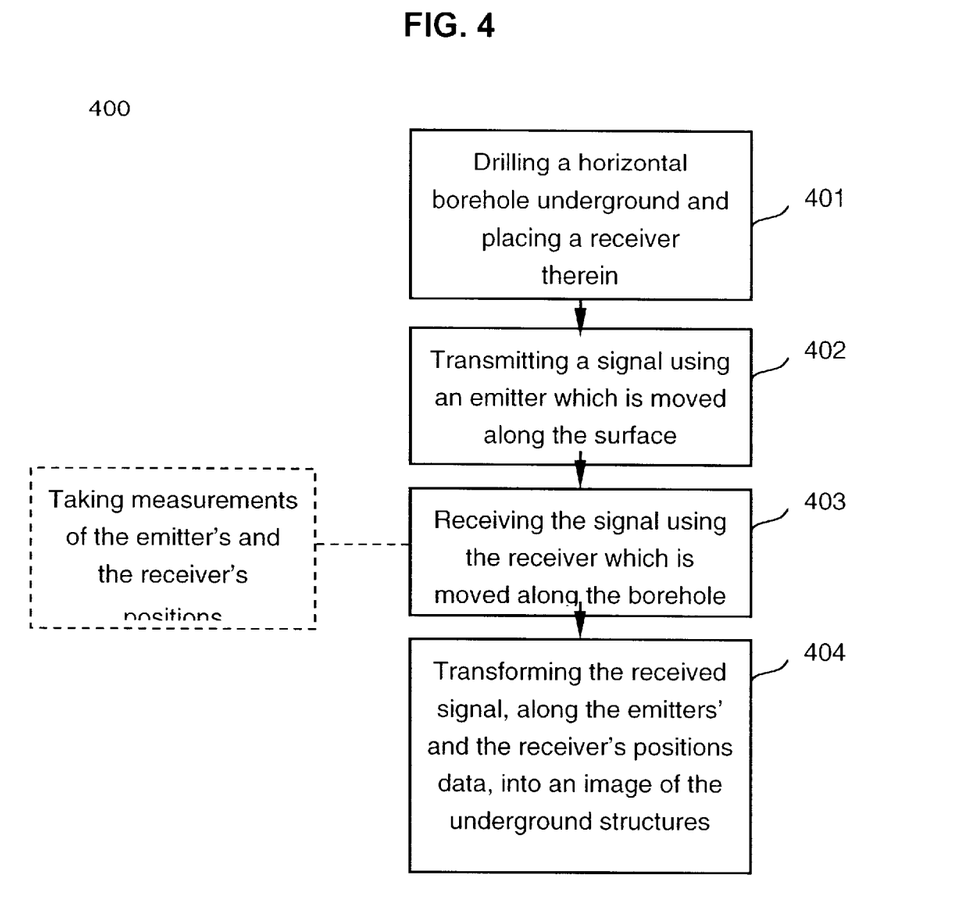
FIG. 4 is a flow diagram illustrating a process of the operation according to the third embodiment of the invention.

FIG. 4 is a flow diagram illustrating a process 400 according to the third embodiment. The process 400 includes the following steps:

401. Drilling a substantial horizontal borehole with a specific length of passage at a specific depth from the surface of the earth. The length of the passage and the depth from the surface are so chosen that the horizontal borehole can pass safely beneath a region where any potential utilities may lie;
402. Transmitting a signal from an emitter, which is moved along a pathway along the surface. The pathway may be linear or nonlinear. The moving process can be repeated on one pathway or on different pathways;
403. Receiving the signal using a receiver, which is moved at intervals from one position point to the other along the horizontal borehole's passage or continuously from one end to the other end of the borehole's passage. During the emitter's and the receiver's moving process, the signal is received from the emitter, and concurrently, measurements of the emitter's and the receiver's positions are taken; and
404. Transforming the received signal, along with the information on the emitter's and the receiver's positions relative to the underground structures into an image of the underground structures using a data processing unit.

In a fourth embodiment, instead of moving a single receiver, an array of receivers is positioned along the passage of the horizontal borehole.

Figure 5:
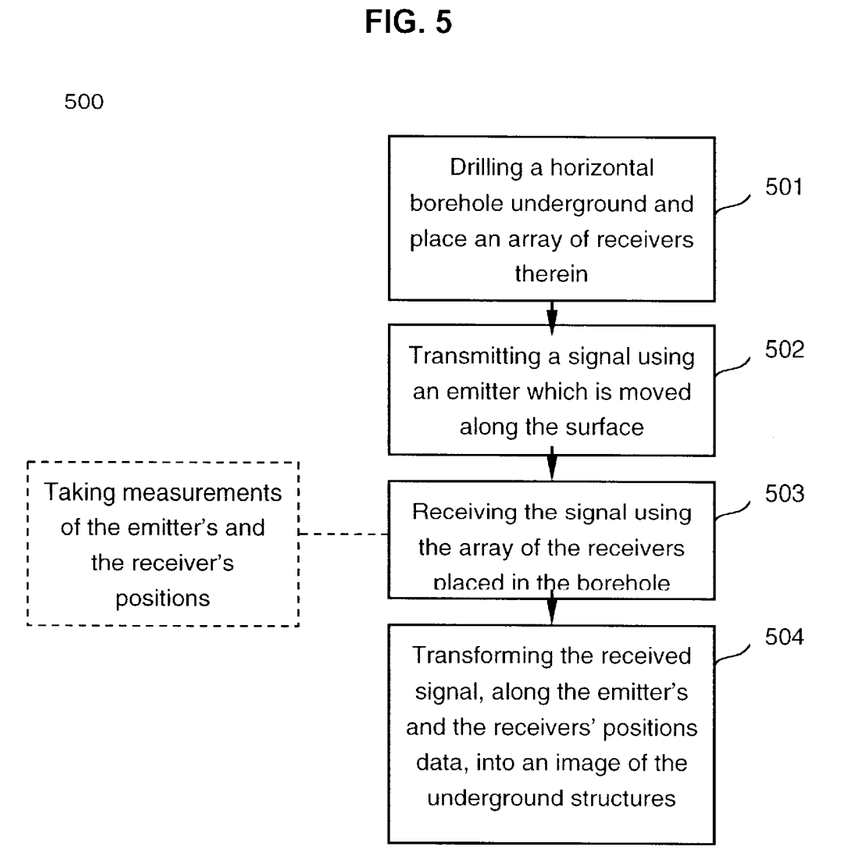
FIG. 5 is a flow diagram illustrating a process of the operation according to the fourth embodiment of the invention.

FIG. 5 is a flow diagram illustrating a process 400 according to the fourth embodiment. The process 500 includes the following steps:

501. Drilling a substantial horizontal borehole with a specific length of passage at a specific depth from the surface of the earth. The length of the passage and the depth from the surface are so chosen that said horizontal borehole can pass safely beneath a region where any potential utilities may lie;
502. Transmitting a signal from an emitter, which is moved at intervals along a pathway along the surface or continuously from one end to the other end of the pathway. The pathway may be linear or nonlinear. The moving process can be repeated on one pathway or on different pathways;
503. Receiving the signal using a receiver comprising an array of receiving devices which are placed along the horizontal borehole's passage. During the emitter's moving process, the signal is received from the emitter, and concurrently, measurements of the emitter's and the receiving devices' positions are taken; and
504. Transforming the received signal, along with the information on the emitter's and the receiving devices' positions relative to the underground structures into an image of the underground structures using a data processing unit.

Any number of signal source types may be employed, such as a seismic wave signal (compression or shear), a radio frequency signals (GPR), a pulse radar signal, an electromagnetic pulse signal, an electrical current signal (with a corresponding resistivity measurement), or a nuclear radiation signal. One likely candidate is a hard X-ray or gamma ray signal, with energies in the range of 0.5 to 5 MeV. Such energy beam corresponds to a minimum in the absorption behaviors of concrete and asphalt. Such an emitter would therefore function effectively in the presence of sidewalks and pavement. Alternatively, a combination of emitter types may be used, with the receiver data from the various signal types combined to provide enhanced accuracy when varied underground materials are present.

Except for the drilling of the horizontal borehole 130, the location system 100 does not require any disruption of the surface. For many types of emitters, the location system does not even require above ground surface contact. Sensors can be conveniently mounted to the bottom of mobile units 170, and measurements can take place with minimal disruption of surface structures and activities.

The capabilities of the present location system exceed those of the prior art systems for several reasons. First, the location system according to this invention obtains direct transmission path measurements, rather than relying on reflected signals. Problems associated with attenuation of signal strength are largely alleviated because a direct signal is much stronger than a reflected signal, as it must pass only once through the intermediate medium.

Second, in the embodiments using an underground emitter or an array of emitters, a more powerful signal may be used without creating undue interference with nearby surface communications in the case of a radio source or introducing unwanted radiation in the case of a nuclear source. In addition, because the signal source can be placed within the horizontal borehole, more effective coupling with the soil is achieved. Accordingly, the location system should be able to operate through asphalt or concrete, and tolerate nearby metal objects without difficulty. Because the system produces an accurate picture it should be able to a much better job than all conventional systems at mapping complex urban subterranean environments with multiple utilities and obstructions.

Finally, the geometry of the horizontal borehole and surface configuration allows the system to gather an increased amount of information compared to systems incorporating vertical boreholes or relying on the reflection of surface emitted signals. This is a direct result of the increased number of distinct transmission pathways for which signal measurements can be obtained. The increased amount of data decreases the uncertainty in the constructed image. The resulting image therefore provides a more accurate understanding of the underground environment.

The present invention provides an accurate, high-resolution image of underground utilities and other objects such as soil variations, rock formations, voids, and inclusions. It does so with minimal disruption above ground because only one horizontal borehole is required. While the present invention may be more expensive than currently available utility location technologies, it provides satisfactory results in situations where current technologies fail. In complex urban environments, where the cost of disrupting surface activities is high, and the cost of inadvertently damaging underground utilities even higher, the extra expense is more than justified by improved performance.

Although the invention is described herein with reference to the preferred embodiment, one skilled in the art will readily appreciate that other applications may be substituted for those set forth herein without departing from the spirit and scope of the invention.

Accordingly, the invention should only be limited by the Claims included below.

What is claimed is:

1. A method for locating and identifying underground structures, comprising the steps of:
    drilling a substantially horizontal borehole with a length of passage at a depth from a surface of the earth, wherein said length of passage and said depth from a surface of the earth are so chosen that said horizontal borehole passes safely beneath a region wherein any potential utilities may lie;
    transmitting a signal from a transmitter with an emitter which is moved along said horizontal borehole's passage;
    receiving said signal by a receiver which is moved along a pathway along the surface of the earth;
    taking measurements of said transmitter's and receiver's positions; and
    transforming the received signal, along with information representative of said measurements, into a representation of the underground structures using a data processing unit.

2. The method of claim 1, wherein said step of transmitting comprises the step of:
    moving said emitter at intervals from one position point to another along said horizontal borehole's passage.

3. The method of claim 1, wherein said step of transmitting comprises the step of:
    moving said emitter continuously from one end to the other end of said horizontal borehole's passage.

4. The method of claim 1, wherein said step of transmitting comprises the step of:
    moving said emitter from one end to the other end of said horizontal borehole's passage repeatedly.

5. The method of claim 1, wherein said pathway along which said receiver is moved is a linear pathway.

6. The method of claim 5, wherein said linear pathway is spatially perpendicular to said horizontal borehole.

7. The method of claim 6, wherein the midpoint of said linear pathway is aligned directly above the midpoint of said horizontal borehole's passage.

8. The method of claim 1, wherein said receiver is coupled to a cart or a vehicle.

9. The method of claim 1, wherein both said receiver and said data processing unit are coupled to a cart or a vehicle.

10. The method of claim 1, wherein if said potential utilities are of a linear nature and their orientation is known, then said horizontal borehole is oriented perpendicular to said utilities.

11. The method of claim 1, wherein said signal is selected from a group consisting of:
    a seismic wave signal;
    a radio frequency signal;
    a pulse radar signal;
    an electromagnetic pulse signal;
    an electrical current signal;
    a nuclear radiation signal;
    a x-ray signal; and
    a gamma ray signal.

12. The method of claim 1, wherein said representation of the underground structures is a three-dimensional image.

13. A method for locating and identifying underground structures, comprising the steps of:
    drilling a horizontal borehole with a length of passage at a depth from the surface of the earth, wherein said length of passage and said depth from the surface of the earth are so chosen that said horizontal borehole passes safely beneath a region where any potential utilities may lie;
    transmitting signals from a transmitter which comprises an array of emitters, wherein said transmitter is placed along said horizontal borehole's passage,
    receiving said signals by a receiver which is moved along a pathway along the surface of the earth,
    taking measurements of said receiver's and said emitters' positions; and
    transforming received signals, along with information representative of said measurements, into a representation of the underground structures using a data processing unit.

14. The method of claim 13, wherein said data processing unit can differentiate signals from each individual emitter on the basis of frequency, phase, or pulsing pattern.

15. The method of claim 13, wherein said pathway along which said receiver is moved is a linear pathway.

16. The method of claim 15, wherein said linear pathway is spatially perpendicular to said horizontal borehole.

17. The method of claim 16, wherein the midpoint of said linear pathway is aligned directly above the midpoint of said horizontal borehole's passage.

18. The method of claim 13, wherein said receiver is coupled to a cart or a vehicle.

19. The method of claim 13, wherein both said receiver and said data processing unit are coupled to a cart or a vehicle.

20. The method of claim 13, wherein if said potential utilities are of a linear nature and their orientation is known, then said horizontal borehole is oriented perpendicular to said utilities.

21. The method of claim 13, wherein said receiver is repeatedly moved from one end to the other end of said pathway.

22. The method of claim 13, said receiver is moved along different pathways along the surface.

23. The method of claim 13, wherein said signal is selected from a group consisting of:
- a seismic wave signal;
- a radio frequency signal;
- a pulse radar signal;
- an electromagnetic pulse signal;
- an electrical current signal;
- a nuclear radiation signal;
- a x-ray signal; and
- a gamma ray signal.

24. The method of claim 13, wherein said representation of the underground structures is a three-dimensional image.

25. A method for locating and identifying underground structures, comprising the steps of:
- drilling a horizontal borehole with a length of passage at a depth from the surface of the earth, wherein said length of passage and said depth from the surface of the earth are so chosen that said horizontal borehole passes safely beneath a region where any potential utilities may lie;
- transmitting a signal from an emitter which is moved along a pathway along the surface;
- receiving said signal by a receiver which is moved along said horizontal borehole's passage;
- taking measurements of said emitter's and said receiver's positions; and
- transforming the received signal, along with information representative of said measurements, into a representation of the underground structures using a data processing unit.

26. The method of claim 25, wherein said step of receiving comprises the step of:
- moving said receiver at intervals from one position point to another along said horizontal borehole's passage.

27. The method of claim 25, wherein said step of receiving comprises the step of:
- moving said receiver continuously from one end to the other end of said horizontal borehole's passage.

28. The method of claim 25, wherein said step of receiving comprises the step of:
- moving said receiver from one end to the other end of said horizontal borehole's passage repeatedly.

29. The method of claim 25, wherein said pathway along which said emitter is moved is a linear pathway.

30. The method of claim 29, wherein said linear pathway is spatially perpendicular to said horizontal borehole.

31. The method of claim 30, wherein the midpoint of said linear pathway is aligned directly above the midpoint of said horizontal borehole's passage.

32. The method of claim 25, wherein said emitter is moved along said pathway repeatedly.

33. The method of claim 25, wherein said emitter is moved along different pathways along the surface.

34. The method of claim 25, wherein said emitter is coupled to a cart or a vehicle.

35. The method of claim 25, wherein both said emitter and said data processing unit are coupled to a cart or a vehicle.

36. The method of claim 25, wherein if said potential utilities are of a linear nature and their orientation is known, then said horizontal borehole is oriented perpendicular to said utilities.

37. The method of claim 25, wherein said signal is selected from a group consisting of:
- a seismic wave signal;
- a radio frequency signal;
- a pulse radar signal;
- an electromagnetic pulse signal;
- an electrical current signal;
- a nuclear radiation signal;
- a x-ray signal; and
- a gamma ray signal.

38. The method of claim 25, wherein said representation of the underground structures is a three-dimensional image.

39. A method for locating and identifying underground structures, comprising the steps of:
- drilling a horizontal borehole with a length of passage at a depth from the surface of the earth, wherein said length of passage and said depth from the surface of the earth are so chosen that said horizontal borehole passes safely beneath a region where any potential utilities may lie;
- transmitting a signal from an emitter which is moved along a pathway along the surface of the earth;
- receiving said signal by a receiver which comprises an array of receiving devices, wherein said receiver is placed along said horizontal borehole's passage;
- taking measurements of said emitter's and said receiving devices' positions; and
- transforming the received signal, along with information representative of said measurements, into a representation of the underground structures using a data processing unit.

40. The method of claim 39, wherein said step of transmitting comprises the step of:
- moving said emitter at intervals from one position point to another of said pathway along the surface.

41. The method of claim 39, wherein said step of transmitting comprises the step of:
- moving said emitter continuously from one end to the other end of said pathway along the surface.

42. The method of claim 39, wherein said step of transmitting comprises the step of:
- moving said emitter from one end to the other end of said pathway repeatedly.

43. The method of claim 39, wherein said pathway along which said emitter is moved is a linear pathway.

44. The method of claim 43, wherein said linear pathway is spatially perpendicular to said horizontal borehole.

45. The method of claim 44, wherein the midpoint of said linear pathway is aligned directly above the midpoint of said horizontal borehole's passage.

46. The method of claim 39, wherein said emitter is moved along different pathways along the surface.

47. The method of claim 39, wherein said emitter is coupled to a cart or a vehicle.

48. The method of claim 39, wherein both said emitter and said data processing unit are coupled to a cart or a vehicle.

49. The method of claim 39, wherein if said potential utilities are of a linear nature and their orientation is known, then said horizontal borehole is oriented perpendicular to said utilities.

50. The method of claim 39, wherein said signal is selected from a group consisting of:
- a seismic wave signal;
- a radio frequency signal;

a pulse radar signal;

an electromagnetic pulse signal;

an electrical current signal;

a nuclear radiation signal;

a x-ray signal; and a gamma ray signal.

51. The method of claim 39, wherein said representation of the underground structures is a three-dimensional image.

52. A system for locating and identifying underground structures, comprising:

a means for drilling a substantially horizontal borehole with a length of passage at a depth from the surface of the earth, wherein said length of passage and said depth from the surface of the earth are so chosen that said horizontal borehole passes safely beneath a region where any potential utilities may lie;

an emitter which is moved along said horizontal borehole and transmits a signal;

a receiver which receives said signal;

a means for taking measurements of said emitter's and said receiver's positions; and a data processing unit which transforms the received signal, along with information representative of said measurements, into a representation of the underground structures.

53. The system of claim 52, wherein said receiver is coupled to a cart or vehicle.

54. The system of claim 52, wherein both said receiver and said data processing unit are coupled to a cart or vehicle.

55. The system of claim 52, wherein said signal is selected from a group consisting of:

a seismic wave signal;

a radio frequency signal;

a pulse radar signal;

an electromagnetic pulse signal;

an electrical current signal;

a nuclear radiation signal;

a x-ray signal; and a gamma ray signal.

56. The system of claim 52, wherein said representation of the underground structures is a three-dimensional image.

57. A system for locating and identifying underground structures, comprising:

a means for drilling a horizontal borehole with a length of passage at a depth from the surface of the earth, wherein said length of passage and said depth from the surface of the earth are so chosen that said horizontal borehole passes safely beneath a region where any potential utilities may lie;

a transmitter which comprises an array of emitters, wherein said transmitter is placed along said horizontal borehole and said emitters transmit signals;

a receiver which is moved along a pathway along the surface and receives said signals from said emitters;

a means for taking measurements of said emitters' and said receiver's positions; and a data processing unit which transforms received signals, along with information representative of said measurements, into a representation of the underground structures.

58. The system of claim 57, wherein said data processing unit can differentiate received signal from each of said emitters on the basis of frequency, phase, or pulsing pattern.

59. The system of claim 57, wherein said receiver is coupled to a cart or vehicle.

60. The system of claim 57, wherein both said receiver and said data processing unit are coupled to a cart or vehicle.

61. The system of claim 57, wherein said signal is selected from a group consisting of:

a seismic wave signal;

a radio frequency signal;

a pulse radar signal;

an electromagnetic pulse signal;

an electrical current signal;

a nuclear radiation signal;

a x-ray signal; and a gamma ray signal.

62. The system of claim 57, wherein said representation of the underground structures is a three-dimensional image.

63. A system for locating and identifying underground structures, comprising:

a means for drilling a horizontal borehole with a length of passage at a depth from the surface of the earth, wherein said length of passage and said depth from the surface of the earth are so chosen that said horizontal borehole passes safely beneath a region where any potential utilities may lie;

an emitter which moves along a pathway along the surface of the earth and transmits a signal;

a receiver which is moved along said borehole's passage and receives said signal;

a means for taking measurements of said emitter's and said receiver's positions; and a data processing unit which transforms received signal, along with information representative of said measurements, into a representation of the underground structures.

64. The system of claim 63, wherein said emitter is coupled to a cart or vehicle.

65. The system of claim 63, wherein both said emitter and said data processing unit are coupled to a cart or vehicle.

66. The system of claim 63, wherein said signal is selected from a group consisting of:

a seismic wave signal;

a radio frequency signal;

a pulse radar signal;

an electromagnetic pulse signal;

an electrical current signal;

a nuclear radiation signal;

a x-ray signal; and a gamma ray signal.

67. The system of claim 63, wherein said representation of the underground structures is a three-dimensional image.

68. A system for locating and identifying underground structures, comprising:

a means for drilling a horizontal borehole with a fixed length of passage at a depth from the surface of the earth, wherein said length of passage and said depth from the surface are so chosen that said horizontal borehole passes safely beneath a region where any potential utilities may lie;

an emitter which is moved along a pathway and transmits a signal;

a receiver which comprises an array of receiving devices, wherein said receiver is placed along said horizontal borehole's passage;

a means for taking measurements of said emitter's and said receiving devices' positions; and a data processing unit which transforms received signal, along with information representative of said measurements, into a representation of the underground structures.

69. The system of claim 68, wherein said emitter is coupled to a cart or vehicle.

70. The system of claim 68, wherein both said emitter and said data processing unit are coupled to a cart or vehicle.

71. The system of claim 70, wherein said signal is selected from a group consisting of:

a seismic wave signal;

a radio frequency signal;

a pulse radar signal;

an electromagnetic pulse signal;

an electrical current signal;

a nuclear radiation signal;

a x-ray signal; and a gamma ray signal.

72. The system of claim 68, wherein said representation of the underground structures is a three-dimensional image.

73. A method for locating and identifying underground structures, comprising the steps of:

drilling a horizontal borehole with a length of passage at a depth from the surface of the earth, wherein said length of passage and said depth from the surface of the earth are so chosen that said horizontal borehole passes safely beneath a region where any potential utilities may lie;

transmitting signals from transmitting unit comprising an array of emitters, wherein said transmitting unit is placed along said horizontal borehole's passage;

receiving said signals by a receiving unit comprising an array of receivers;

taking measurements of said emitters' and said receivers' positions; and transforming received signals, along with information representative of said measurements, into a representation of the underground structures using a data processing unit.

74. The method of claim 73, wherein said receiving unit is coupled to a cart or a vehicle.

75. The method of claim 73, wherein both said receiving unit and said data processing unit are coupled to a cart or a vehicle.

76. The method of claim 75, wherein if said potential utilities are of a linear nature and their orientation is known, then said horizontal borehole is oriented perpendicular to said utilities.

77. The method of claim 73, wherein said signal is selected from a group consisting of:

a seismic wave signal;

a radio frequency signal;

a pulse radar signal;

an electromagnetic pulse signal;

an electrical current signal;

a nuclear radiation signal;

a x-ray signal; and a gamma ray signal.

78. The method of claim 73, wherein said representation of the underground structures is a three-dimensional image.

79. A system for locating and identifying underground structures, comprising:

a means for drilling a horizontal borehole with a length of passage at a depth from the surface of the earth, wherein said length of passage and said depth from the surface of the earth are so chosen that said horizontal borehole passes safely beneath a region where any potential utilities may lie;

a transmitting unit comprising an array of emitters, wherein said transmitting unit is placed along said horizontal borehole's passage;

a receiving unit comprising an array of receivers which receive signals transmitted by said emitters;

a means for taking measurements of said emitters' and said receivers' positions; and a data processing unit which transforms received signal, along with information representative of said measurements, into a representation of the underground structures.

80. The system of claim 79, wherein said receiving unit is coupled to a cart or a vehicle.

81. The system of claim 79, wherein both said receiving unit and said data processing unit are coupled to a cart or a vehicle.

82. The system of claim 79, wherein if said potential utilities are of a linear nature and their orientation is known, then said horizontal borehole is oriented perpendicular to said utilities.

83. The system of claim 79, wherein said signal is selected from a group consisting of:

a seismic wave signal;

a radio frequency signal;

a pulse radar signal;

an electromagnetic pulse signal;

an electrical current signal;

a nuclear radiation signal;

a x-ray signal; and a gamma ray signal.

84. The system of claim 79, wherein said representation of the underground structures is a three-dimensional image.

* * * * *

UNITED STATES PATENT AND TRADEMARK OFFICE
CERTIFICATE OF CORRECTION

PATENT NO. : 6,725,161 B1  Page 1 of 1
APPLICATION NO. : 09/941426
DATED : April 20, 2004
INVENTOR(S) : W. Daniel Hillis and Bran Ferren It is certified that error appears in the above-identified patent and that said Letters Patent is hereby corrected as shown below:

In the Claims:

Column 8, line 40, claim 13: "horizontal borehole's passage," should read
--horizontal borehole's passage;--

Column 8, line 42, claim 13: "along the surface of the earth," should read
--along the surface of the earth;--

Column 13, line 14, claim 71: "The system of claim 70, wherein" should read
--The system of claim 68, wherein--

Column 13, line 53, claim 76: "The system of claim 75, wherein" should read
--The system of claim 73, wherein--

Signed and Sealed this
Eighth Day of October, 2013

Teresa Stanek Rea
*Deputy Director of the United States Patent and Trademark Office*